(12) United States Patent
F et al.

(10) Patent No.: US 9,137,270 B2
(45) Date of Patent: Sep. 15, 2015

(54) BINDING MULTIPLE ADDRESSES TO A SOCKET IN A NETWORK SYSTEM

(71) Applicant: INTERNATIONAL BUSINESS MACHINES CORPORATION, Armonk, NY (US)

(72) Inventors: Brabson Roy F, Raleigh, NC (US); Alfred B Chirstensen, Durham, NC (US); Constantinos Kassimis, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 172 days.

(21) Appl. No.: 13/692,456

(22) Filed: Dec. 3, 2012

(65) Prior Publication Data
US 2014/0156855 A1 Jun. 5, 2014

(51) Int. Cl.
*G06F 15/16* (2006.01)
*H04L 29/06* (2006.01)
*H04L 29/12* (2006.01)
*H04W 76/02* (2009.01)

(52) U.S. Cl.
CPC ........ *H04L 65/1069* (2013.01); *H04L 61/6086* (2013.01); *H04W 76/02* (2013.01)

(58) Field of Classification Search
CPC .. H04W 76/02; H04L 69/165; H04L 61/6086
USPC ................. 709/200–202, 220, 245, 227–228; 370/254
See application file for complete search history.

(56) References Cited

U.S. PATENT DOCUMENTS

| | | | |
|---|---|---|---|
| 6,658,469 B1 * | 12/2003 | Massa et al. | 709/224 |
| 6,862,274 B1 | 3/2005 | Tsao | |
| 7,171,492 B1 | 1/2007 | Borella | |
| 7,657,642 B2 | 2/2010 | Blanchet | |
| 7,698,439 B2 * | 4/2010 | Zuberi | 709/228 |
| 7,756,984 B2 * | 7/2010 | Burr et al. | 709/228 |
| 7,779,158 B2 * | 8/2010 | Ohhira | 709/245 |

(Continued)

FOREIGN PATENT DOCUMENTS

WO 2004084492 A1 9/2004

OTHER PUBLICATIONS

Briley—"IPv4 vs IPv6—What Are They, Exactly?", TheTechlabs, Copyright 2010-2012 (pp. 1-5).

(Continued)

*Primary Examiner* — Moustafa M Meky
(74) *Attorney, Agent, or Firm* — Parashos Kalaitzis; Mark P Kahler

(57) ABSTRACT

A TCP/IP socket extension may bind a single socket to more than one IP address. The socket API extension may allow a user to bind a socket to a list of IP addresses instead of a single IP address. Additional socket APIs may allow applications to bind an existing socket to one or more additional IP addresses. Bind-specific support may enhance a user's capability to specify one or more IPv4 addresses and/or IPv6 addresses or other addresses to bind to a generic server information handling system (IHS). The method may convert a generic server IHS into a bind-specific server IHS that accepts new connections over both the IPv4 and IPv6 network transports and/or other network transports without requiring changes to the server IHS. A modified TCP/IP stack may provide support for multiple sockets. The method may map multiple address/port/protocol tuples to the same socket.

11 Claims, 7 Drawing Sheets

(56) References Cited

U.S. PATENT DOCUMENTS

| | | | | |
|---|---|---|---|---|
| 7,930,349 | B2* | 4/2011 | Hussain et al. | 709/205 |
| 8,291,486 | B2* | 10/2012 | Morimoto | 726/12 |
| 2002/0199000 | A1 | 12/2002 | Banerjee | |
| 2004/0162909 | A1 | 8/2004 | Choe | |
| 2004/0184465 | A1 | 9/2004 | Lee | |
| 2005/0030959 | A1 | 2/2005 | Kunze | |
| 2005/0138166 | A1 | 6/2005 | Blanchet | |
| 2006/0075080 | A1* | 4/2006 | Burr et al. | 709/223 |
| 2007/0198735 | A1 | 8/2007 | Kim | |
| 2007/0297334 | A1* | 12/2007 | Pong | 370/235 |
| 2008/0071893 | A1* | 3/2008 | Ohhira | 709/222 |
| 2008/0077692 | A1* | 3/2008 | Zuberi | 709/227 |
| 2011/0271087 | A1 | 11/2011 | O'Niell | |
| 2011/0292936 | A1 | 12/2011 | Wang | |
| 2012/0300633 | A1* | 11/2012 | Friedman et al. | 370/235 |
| 2013/0182713 | A1* | 7/2013 | Giacomoni et al. | 370/400 |
| 2013/0185430 | A1* | 7/2013 | Giacomoni et al. | 709/225 |

OTHER PUBLICATIONS

Brown—Using z/OS Communications Server TCP/IP in a Common INET (multistack) Environment, IBM, (Sep. 28, 2006) (pp. 1-34).

Cisco—"Dual Stack IPv4/IPv6 Devices", Copyright 2010, Cisco Systems, Inc. (p. 1).

Huston—"Dual Stack Esotropia", downloaded from https://labs.ripe.net/Members/gih/dual-stack-esotropia on Jul. 29, 2012 (pp. 1-22).

IBM—"Communication Programming Interface", downloaded fromhttp://publib.boulder.ibm.com/infocenter/pseries/v5r3/topic/com.ibm.aix.progcomm/doc/progcomc/skt_interf.htm on Nov. 2, 2012 (pp. 1-2).

Moscola—"Implementation of Network Application Layer Parser for Multiple TCP/IP Flows in Reconfigurable Devices", Field Programmable Logic and Applications, 2006, FPL '06, International Conference on Date of Conference: Aug. 28-30, 2006 (pp. 1-4).

Varadaraja—"Socket Programming" (pp. 1-20), downloaded from http://courses.cs.vt.edu/~cs4254/fall04/slides/Socket%20Programming_6.pdf, (2004), (pp. 1-20).

Zos—"Default route usage changed in z/OS 1.11 for CINET environments", IBM, downloaded from ttp://www-01.ibm.com/support/docview.wss?uid=swg21410999 on Jul. 29, 2012 (pp. 1-5).

* cited by examiner

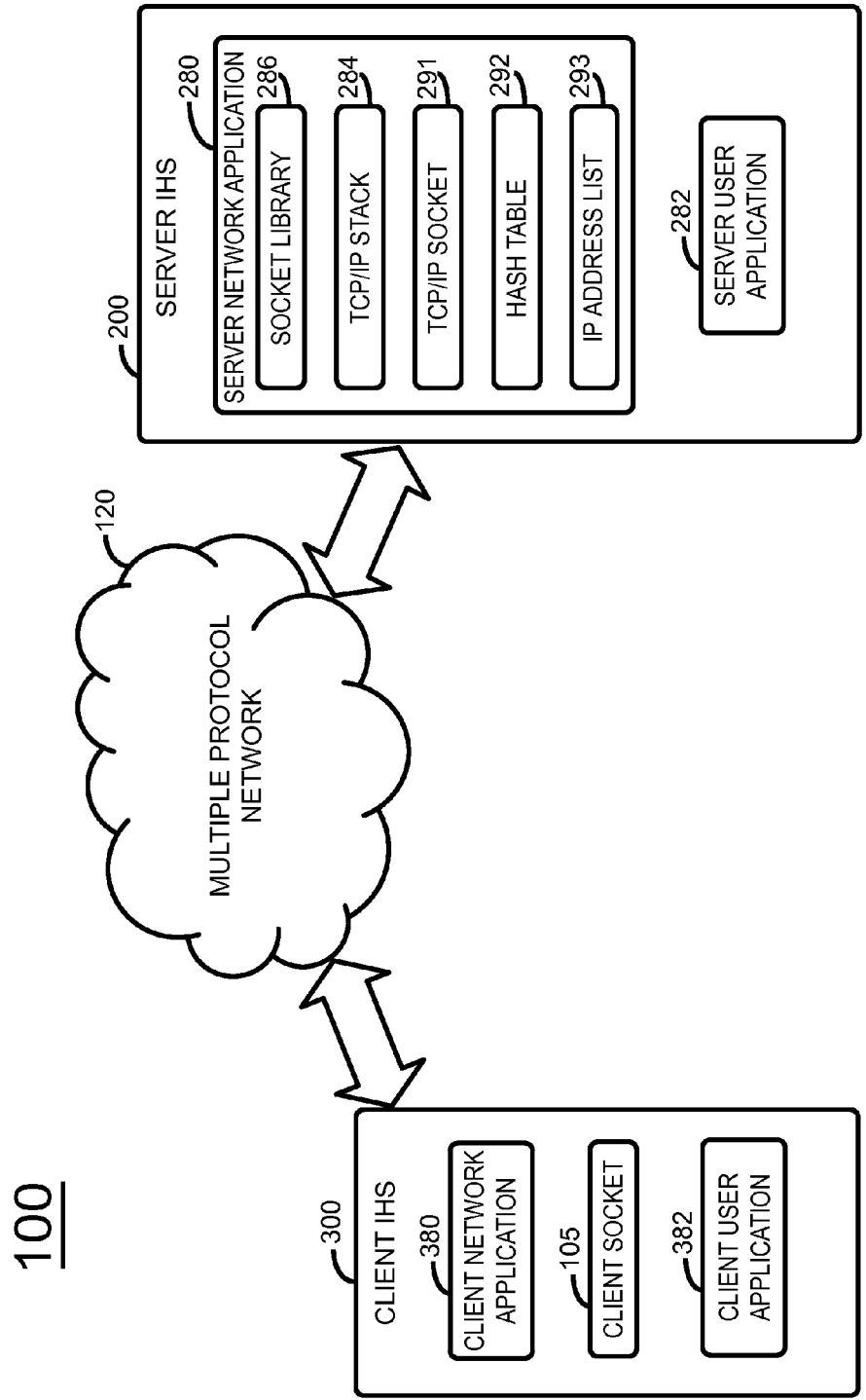

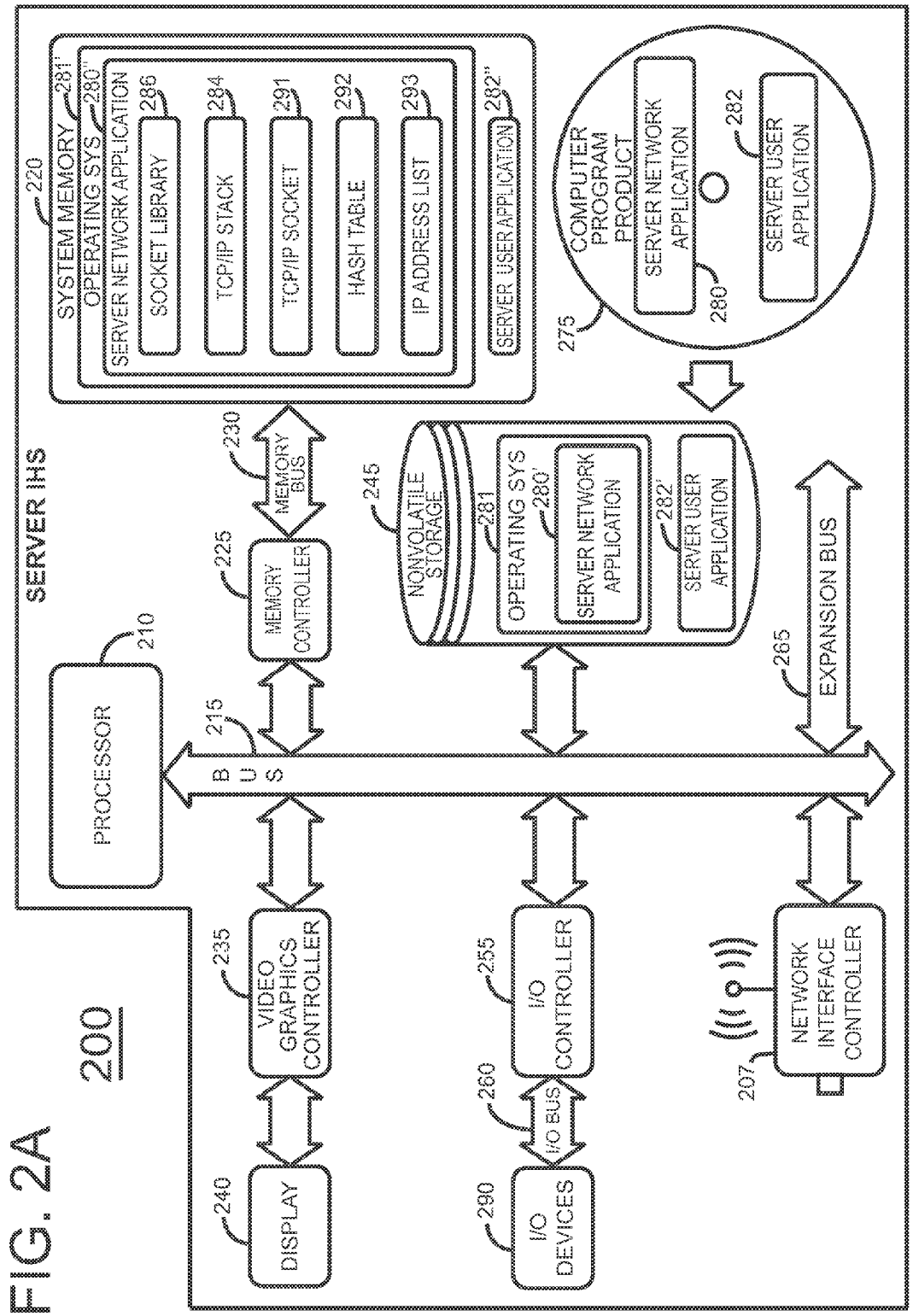

BINDING MULTIPLE ADDRESSES TO A SOCKET IN A NETWORK SYSTEM

BACKGROUND

The disclosures herein relate generally to communicating with applications in information handling systems (IHSs) that use transmission control protocol/internet protocol (TCP/IP). TCP/IP applications use sockets to communicate with each other. A TCP/IP server may create within its TCP/IP application a socket and bind the socket to a port/IP pair to facilitate communication with a TCP/IP client.

BRIEF SUMMARY

In yet another embodiment, an information handling system (IHS) is disclosed that includes a processor. The IHS also includes a memory that is coupled to the processor. The memory is configured to create a socket in the IHS and map multiple IP addresses to the socket. The memory is further configured such that the socket listens for connection requests on the multiple IP addresses and receives connection requests for the multiple addresses via a multiple protocol network.

In still another embodiment, an information handling system (IHS) is disclosed that includes a processor and a memory coupled to the processor. The memory is configured to create a plurality of sockets in the IHS and to map a respective IP address to each of the sockets of the plurality of sockets. The memory is further configured to bind each socket of the plurality of sockets to a respective IP address. The memory is also configured such that each of the sockets listens for connection requests on the multiple IP addresses and each of the sockets receives connection requests for each socket's respective IP address via a multiple protocol network.

In yet another embodiment, a server network application computer program product is disclosed. The computer program product includes a computer readable storage medium for use in an information handling system (IHS). The computer program product also includes first instructions that create a socket in the IHS. The computer program product further includes second instructions that map multiple IP addresses to the socket. The computer program product still further includes third instructions that configure the socket to listen for connection requests on the multiple IP addresses. The computer program product also includes fourth instructions that receive connection requests for the multiple addresses via a multiple protocol network. The first, second, third and fourth instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

FIG. 1 is a communication network using multiple transport protocols.

FIG. 2A is a block diagram of a representative server IHS that the communication network may employ.

DETAILED DESCRIPTION

Figure 2B:
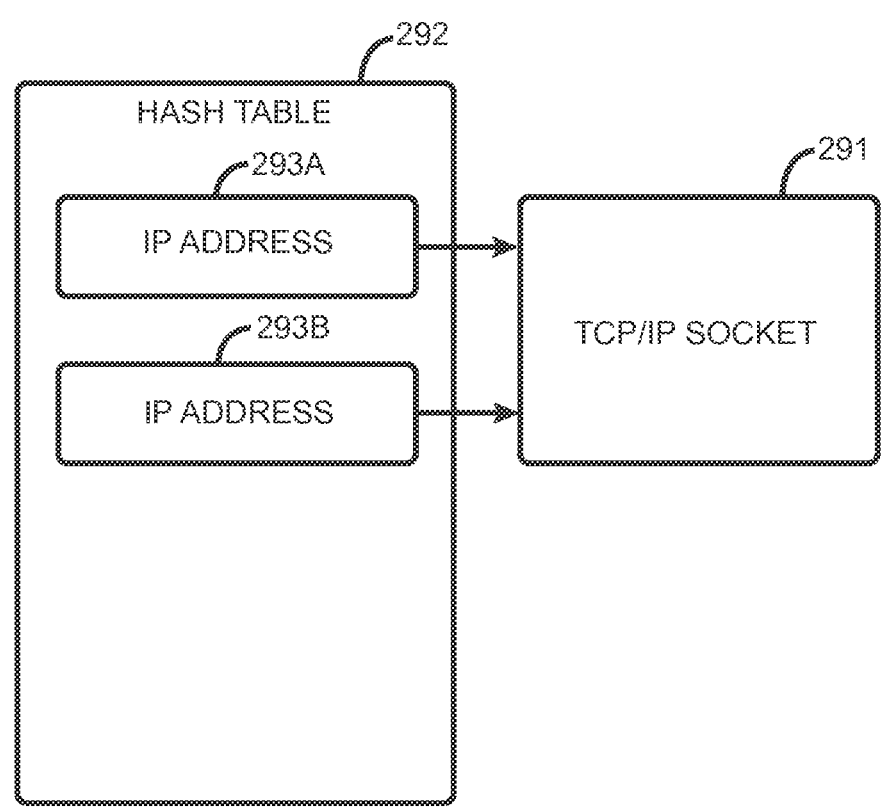
FIG. 2B is a block diagram of a hash table in the server IHS.

In the disclosed communication system, a client user application in a client information handling system (IHS) may connect to a server network application in a server information handling system (IHS) over a multiple protocol network. The server network application may bind a single TCP/IP socket in the server IHS to multiple IP address/port tuples in the server IHS. This binding may form a communication connection between the client user application in the client IHS and the server user application in the server IHS, thus providing communications over the multiple protocol network.

FIG. 1 is a block diagram of one embodiment of the disclosed communication system 100 that includes a client IHS 300 which may include a client user application 382. Communication system 100 may also include a multiple protocol network 120 that couples client IHS 300 to a server IHS 200. Client IHS 300 includes a client network application 380 that facilitates communication over the multiple protocol network 120 with server IHS 200. Client IHS 300 may also include a client user application 382 that may seek to communicate via client network application 380 with server IHS 200. The multiple protocol network 120 may support Internet Protocol (IP), IPv4, and/or IPv6 network transport protocols, as well as other protocols. Client IHS 300 may connect with server IHS 200 over the multiple protocol network 120 using one or more combinations of IP, IPv4, and/or IPv6 network transport protocols and other network transport protocols. Server IHS 200 may include a server user application 282 that may seek to communicate via server network application 280 with client IHS 300.

FIG. 2A is a block diagram of a server information handling system (IHS) 200 that communication system 100 may employ as multiple network protocol server IHS 200. Server IHS 200 includes a processor 210 that may include multiple cores. Server IHS 200 processes, transfers, communicates, modifies, stores or otherwise handles information in digital form, analog form or other form. Server IHS 200 includes a bus 215 that couples processor 210 to system memory 220 via a memory controller 225 and memory bus 230. In one embodiment, system memory 220 is external to processor 210. System memory 220 may be a static random access memory (SRAM) array and/or a dynamic random access memory (DRAM) array. A video graphics controller 235 couples display 240 to bus 215. Nonvolatile storage 245, such as a hard disk drive, CD drive, DVD drive, or other nonvolatile storage couples to bus 215 to provide server IHS 200 with permanent storage of information. I/O devices 290, such as a keyboard and a mouse pointing device, couple to bus 215 via I/O controller 255 and I/O bus 260. One or more expansion busses 265, such as USB, IEEE 1394 bus, ATA, SATA, PCI, PCIE, DVI, HDMI and other expansion busses, couple to bus 215 to facilitate the connection of peripherals and devices to server IHS 200.

Server IHS 200 includes a network interface controller 207 that couples to bus 215 to enable server IHS 200 to connect by wire or wirelessly to a network such as multiple protocol IP network 120. Server IHS 200 may take the form of a desktop, server, portable, laptop, notebook, or other form factor computer or data processing system. Server IHS 200 may take other form factors such as a gaming device, a personal digital assistant (PDA), a portable telephone device, a communication device or other devices that include a processor and memory. Server IHS 200 may also take the form of a portable, laptop, notebook, gaming device, PDA or any battery-powered device.

Server IHS 200 may include a computer program product on digital media 275 such as a CD, DVD or other media. In one embodiment, digital media 275 includes server user application 282 and a server network application 280 on computer program product 275. Nonvolatile storage 245 stores these applications as server network application 280' and server user application 282'. In one embodiment, nonvolatile storage 245 may store server network application 280' as part of operating system 281, as shown in FIG. 2A. When server IHS 200 initializes, server IHS 200 loads operating system 281 (including server network application 280') and server user application 282' into system memory 220 for execution as operating system 281', server network application 280" and server user application 282". Operating system 281', which may include server network application 280", governs the operation of server IHS 200. In an alternative embodiment, server network application 280" may be an application that is separate and distinct from operating system 281'. Server network application 280" includes a TCP/IP stack 284. Server network application 280" also includes a socket library 286 for storing IP addresses. In one embodiment, server network application 280" also includes a TCP/IP socket 291, a hash table 292 and an IP address list 293.

FIG. 2B is a block diagram showing hash table 292 in the server IHS 300. Hash table 292 includes multiple hash table IP address entries such as representative entries 293A and 293B from IP address list 293 that reference the same TCP/IP socket 291. For example, IP address entries 293A and 293B may exhibit representative values 10.2.4.5 and 10.2.4.6, respectively, that both reference socket 291.

Figure 3:
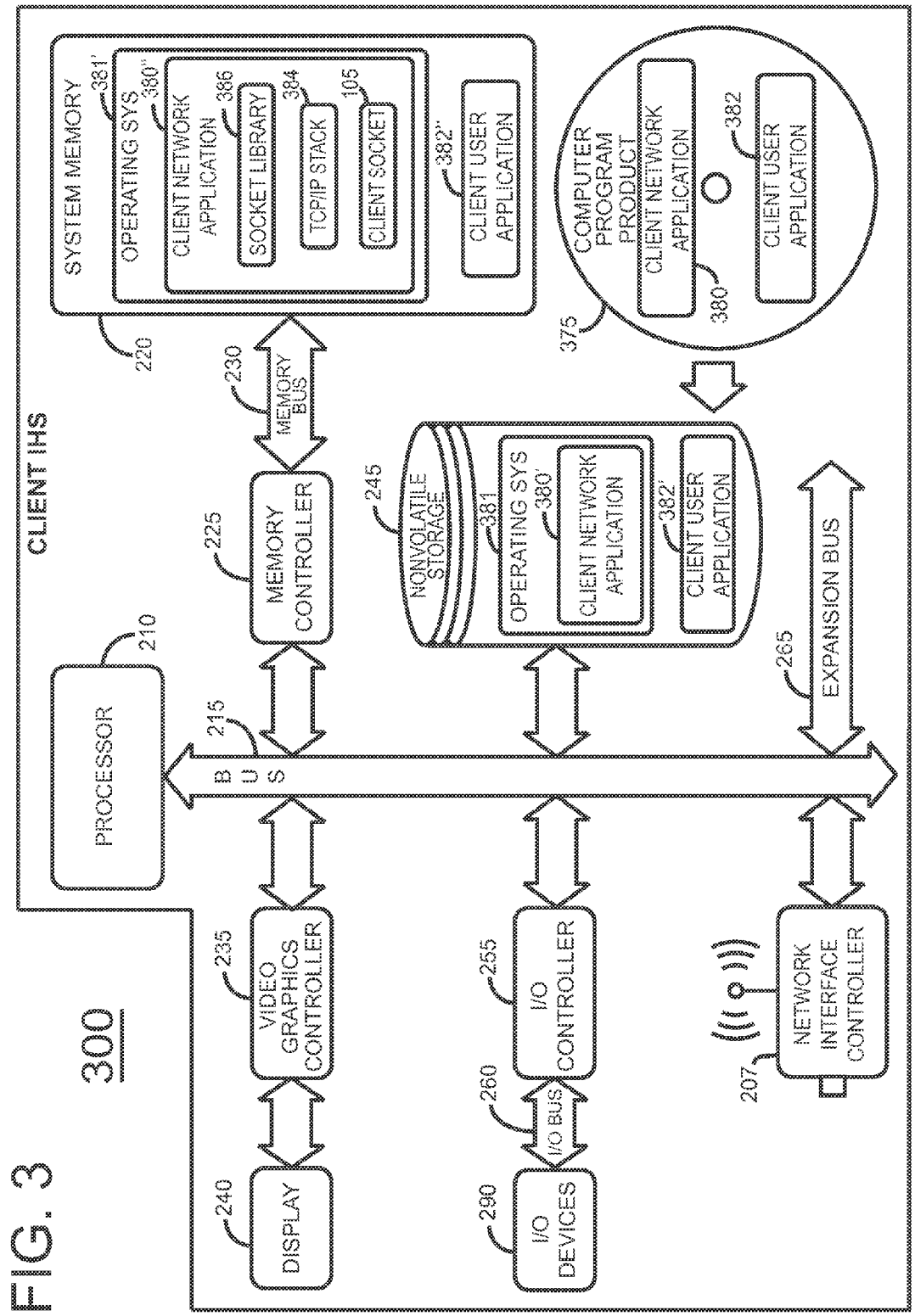
FIG. 3 is a block diagram of a representative client IHS that the communication network may employ.

FIG. 3 is a block diagram of a client information handling system (IHS) 300 that communication system 100 may employ as client IHS 300. Client IHS 300 of FIG. 3 includes many elements in common with server IHS 200 of FIG. 2A. Like numbers indicate like elements when comparing client IHS 300 of FIG. 3 with server IHS 200 of FIG. 2A. However, whereas server IHS 200 of FIG. 2A includes server user application 282, 282' and 282", client IHS 300 of FIG. 3 includes client user application 382 on computer program product 275, client user application 382' in nonvolatile storage 245 and client user application 382" in system memory 220. When client IHS 300 initializes, client IHS 300 loads operating system 281 and client user application 382' into system memory 220 for execution as operating system 281', and client user application 382". Operating system 381', which may include client network application 380", governs the operation of client IHS 300. In an alternative embodiment, client network application 380" may be an application that is a part of operating system 381'. Operating system 381' includes a socket library 386 for storing IP addresses. In one embodiment, client network application 380" includes socket library 386. Operating system 381' also includes a TCP/IP stack 384 in client network application 380" thereof.

Client user application 382 and server user application 280 may use client socket 105 and TCP/IP socket 291, respectively, to communicate with one another over a multiple protocol network 120. In response to a request from client user application 382, client network application 380 may create client socket 105 in client IHS 300 over which to send a connect request to a server IHS 200. As seen in FIG. 2A, the server IHS 200 may create a TCP/IP socket 291 on which to accept new connection requests from client IHS 300. The server IHS 200 may use the socket( ) call to create a new TCP/IP socket 291, the bind( ) call to associate the TCP/IP socket 291 with a local port and IP address, and the listen( ) call to enter the TCP/IP socket 291 into the listening state so that the server IHS 200 may accept new connection requests from client IHS 300. The server network application 280 may bind this TCP/IP socket 291 to one port/IP address pair which may be a specific address (for example, 9.27.76.12) or may be a generic address (for example, 0.0.0.0). In the disclosed methodology, the server network application 280 may bind this TCP/IP socket 291 to multiple port/IP address pairs, as described in more detail below. In one embodiment, TCP/IP socket 291 may be in the TCP/IP stack 284.

In one embodiment, an extension to the TCP/IP socket 291 may allow the single TCP/IP socket 291 to bind to more than one IP address. Operating systems like operating system 280" may include an application programming interface (API) (not specifically shown) that allows application programs to control and use network sockets like TCP/IP socket 291. The extension to the socket API may allow the user application 282" to bind a socket to an IP address list instead of a to single IP address. Additional socket APIs may allow a server user application 282 to bind an existing TCP/IP socket 291 to one or more additional IP addresses. More specifically, enhanced bind-specific support in z/OS (z/OS is a trademark of IBM Corporation) may allow users to specify one or more IPv4 addresses and/or IPv6 addresses to which a generic server IHS 200 may bind. Hash table 292 of FIG. 2B may map a TCP/IP socket to an IP address/port tuple. In one embodiment, enhanced bind-specific support may convert a generic server IHS 200 into a bind-specific server IHS 200 that may accept new connections over both the IPv4 and IPv6 network transport protocols without requiring any changes to the server IHS 200.

In one embodiment, the TCP/IP stack 284 of the network application 280" supports multiple TCP/IP sockets 291. Instead of mapping a single address/port/protocol tuple to one TCP/IP socket 291, multiple address/port/protocol tuples may map to the same TCP/IP socket 291. In one embodiment, to map multiple address/port/protocol tuples to the same TCP/IP socket 291, server network application 280" may add TCP/IP socket 291 to the socket hash table 292 multiple times.

Server IHS 200 configures the TCP/IP socket 291 to allow TCP/IP socket 291 to listen on multiple IP addresses. These IP addresses may be IPv4 addresses, IPv6 addresses or they may be a combination of the addresses of these two protocols or other protocols. In one embodiment, server IHS 200 may configure TCP/IP socket 291 to listen on more than two IP addresses. TCP/IP socket 291 is thus an enhanced TCP/IP socket. The enhanced TCP/IP socket 291 may allow a server network application 280, that supports a single TCP/IP socket 291, to be configured as a bind-specific server IHS 200. A server network application 280, configured to support a single TCP/IP socket 291 as a bind-specific server, may continue to accept connections over both the IPv4 and IPv6 network transport protocols. Allowing a single TCP/IP socket 291 to listen on multiple IP addresses may avoid costly changes to client user applications 382.

In an alternative embodiment, socket library 286 may provide multiprotocol support. The socket library 286 may open one or more TCP/IP sockets 291 within the same TCP/IP stack 284 each time that an application socket is bound to an IP address. Each time that a socket 291 binds to an IP address, socket library 286 may open one or more TCP/IP sockets within the TCP/IP stack 291. The socket layer may include TCP/IP stack 284 and TCP/IP socket 291 and may present a single socket interface to the server network application 280", while managing multiple TCP/IP sockets 291 for communicating with the TCP/IP stack 284. The socket layer provides the socket library 286 with application programming interfaces for TCP/IP sockets that enable inter-process communications. Server user applications 282 may perform operations on the TCP/IP sockets 291 such as a request to accept( ) a new connection. In response to such a connection request, socket library 286 may pass the connection request to each TCP/IP socket 291. The socket library 286 may use asynchronous socket APIs to send multiple accept( ) calls to the TCP/IP stack 284 over each TCP/IP socket 291. Alternatively, the socket library 286 may perform a select( ) on all TCP/IP sockets 291 associated with the server user application 282.

Configuration options outside of the server network application 280" may change a generic server IHS 200 into a bind-specific server IHS 200 at the network application layer. The network application layer may include server application 282. A bind-specific server IHS 200 may accept connections over IPv4, IPv6, or a combination of the two network transport protocols, or other protocols. Changing a generic server IHS 200 to a bind-specific server IHS 200 may avoid costly changes to client user applications.

Figure 4:
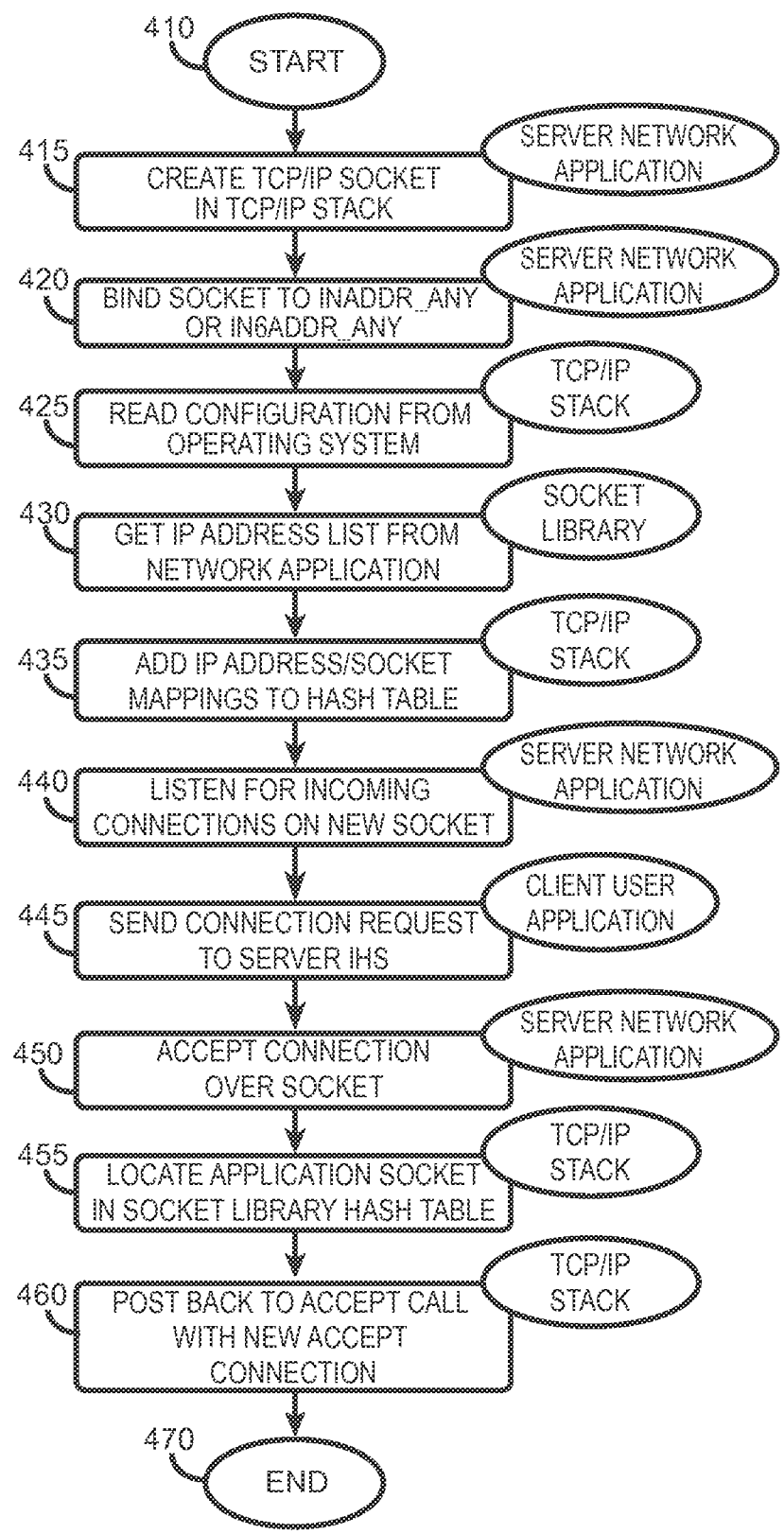
FIG. 4 is a flowchart that depicts an embodiment of the disclosed communication methodology at the TCP/IP stack layer of the server IHS.

The flowchart of FIG. 4 shows how server network application 280" of the server IHS 200 may connect at the TCP/IP socket 291 to client user application 382" in client IHS 300 using multiple network protocols. The flowchart of FIG. 4 depicts an embodiment at the TCP/IP stack 284 layer of the server IHS 200. The TCP/IP stack layer may include TCP/IP stack 284 and TCP/IP socket 291. Operating system 281' of server IHS 200 may employ socket library 286 to store IP addresses. In one embodiment, server network application 280" includes TCP/IP stack 284 and socket library 286. Process flow commences at start block 410. The server network application 280" creates a TCP/IP socket in the TCP/IP stack 284 of server network application 280" in operating system 281", as per block 415. The server network application 280" binds a single listening TCP/IP socket 291 at the TCP/IP stack 284 in the server IHS 200 to multiple IP address/port tuples, such as INADDR_ANY or IN6ADDR_ANY generic addresses, to form a specific IP address/port pair by the TCP/IP stack prior to completing the accept( ) call, as per block 420. The multiple IP address/port tuples may include IP addresses exhibiting different network protocols. The address INADDR_ANY is a generic representative IP network address. The address IN6ADDR_ANY is a generic representative IPv6 network address.

TCP/IP stack 284 reads its configuration from the operating system 281', as per block 425, and retrieves the IP address list 293 from the server network application 280", as per block 430. The list of IP addresses associates IP addresses with a particular socket. The list of IP addresses 293 may include IP addresses of IPv4 or IPv6 network protocols, or combination of those protocols or other protocols. Socket library 286 may include the hash table 292. TCP/IP stack 284 adds the IP address socket mappings into the TCP hash table 292, as per block 435. The server network application 280" listens for incoming connection requests on the newly created TCP/IP socket 291, as per block 440.

The client user application 382 of client IHS 300 sends a connection request to the server IHS 200, as per block 445. This connection request includes a destination IP address that is an address for which the server network application 280" in the server IHS 200 listens, such as one of those addresses added to the hash table 292 as discussed above. The server network application 280" accepts a new connection over that socket, as per block 450. The TCP/IP stack 284 locates the application's TCP/IP socket 291 in its hash table 292 of socket library 286, as per block 455. The TCP/IP stack 284 posts back to the outstanding accept call from the client user application 382 with a newly accepted connection for that particular client user application 382, as per block 460. The disclosed methodology ends at block 470. The IP address/port tuple serves as a key in the hash table. More than one key in the hash table may point to the same socket. The multiple IP address/port tuples may include IP addresses exhibiting different network protocols. The server network application 280" now has a connection to the client user application 382.

Figure 5:
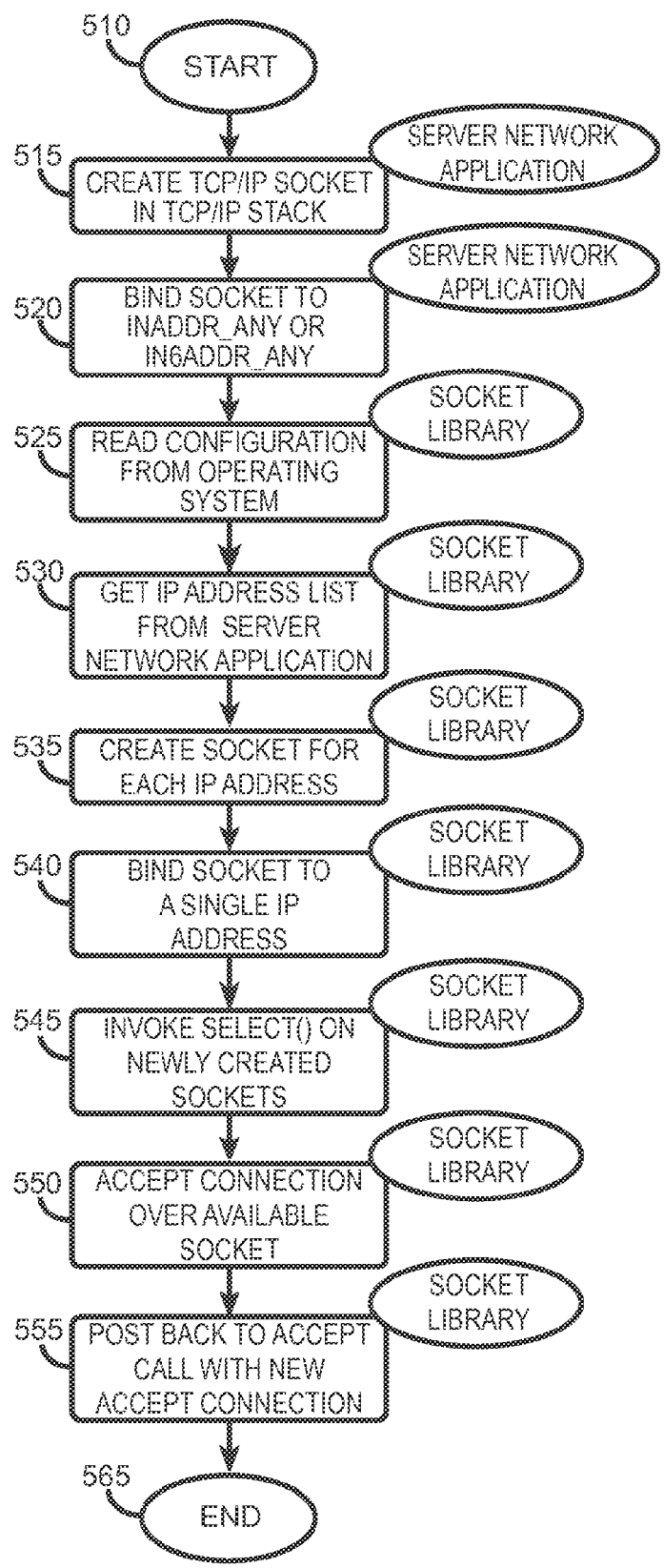
FIG. 5 is a flowchart that depicts an embodiment of the disclosed communication methodology at the socket library layer of the server IHS.

The flowchart of FIG. 5 shows how server network application 280" operating in the operating system 281' of the server IHS 200 may connect to client user application 382 in client IHS 300 by using multiple network protocols. The flowchart of FIG. 5 depicts an embodiment at the socket library 286 layer of the server IHS 200. Operating system 281' may include a socket library 286 for storing IP addresses. Process flow commences with start block 510. Server network application 280" creates a TCP/IP socket in operating system 281' of server IHS 200, as per block 515. The server network application 280" binds a single listening TCP/IP socket 291 at the TCP/IP stack 284 in the server IHS 200 to multiple IP address/port tuples, such as INADDR_ANY or IN6ADDR_ANY generic addresses, to form a specific IP address/port pair by the TCP/IP stack prior to completing the accept( ) call, as per block 520. Multiple IP address/port pairs may include IP addresses exhibiting different network protocols. The socket library 286 reads its configuration from the operating system 281', as per block 525. The socket library 286 acquires the IP address list 293 that associates IP addresses with specific TCP/IP socket 291 from server network application 280", as per block 530. The IP address list 293 may include combinations of IPv4 and/or IPv6 addresses. The socket library 286 creates one socket for each IP address in the IP address list 293, as per block 535. The socket library 286 binds TCP/IP socket 291 to a single IP address from IP address list 293, as per block 540. The socket library 286 invokes a select( ) on the newly created sockets, as per block 545. The socket library 286 accepts a connection over a socket when one of those sockets becomes available, as per block 550. The socket library 286 posts back to an outstanding accept call from the server network application 280 listening on a single TCP/IP socket 291 accepting a new connection for server network application 280", as per block 555. The disclosed methodology ends at end block 565. The server network application 280" in server IHS 400 now has a connection to the client user application 382.

Figure 6:
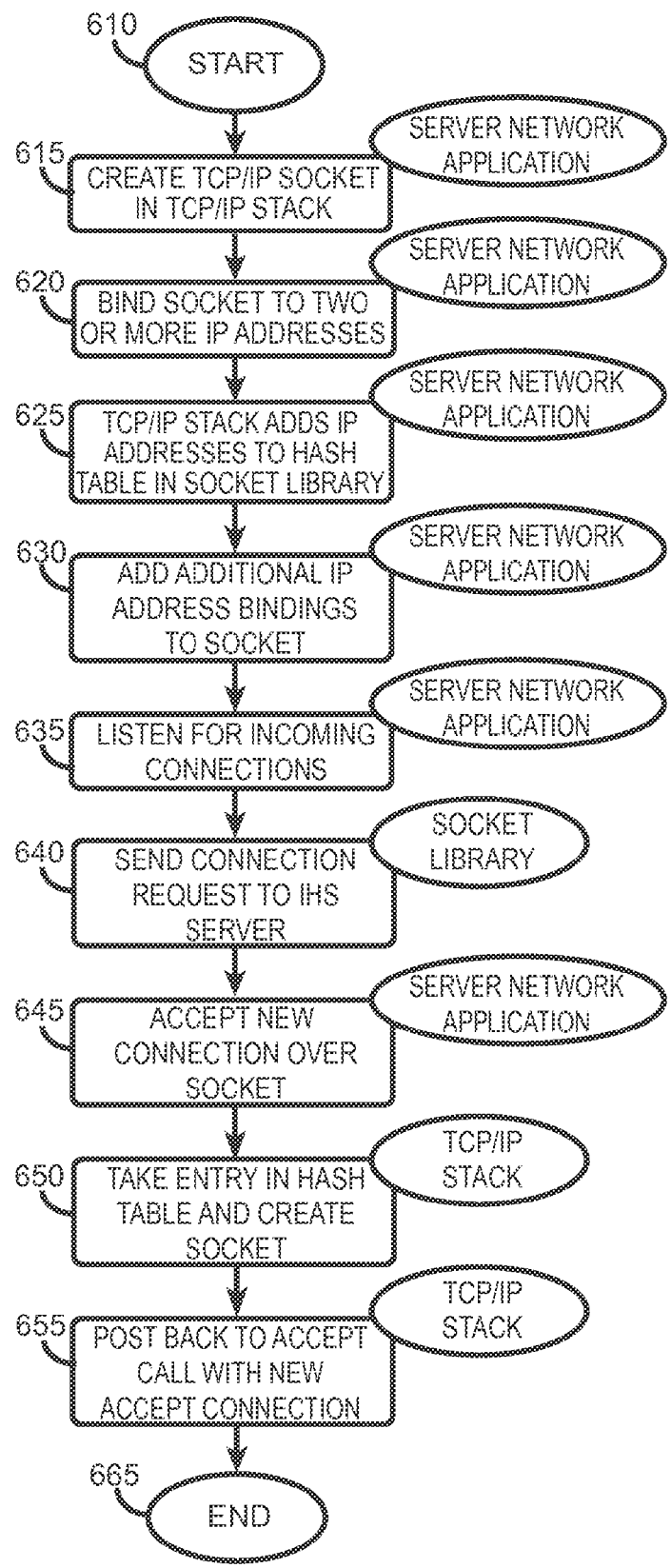
FIG. 6 is a flowchart that depicts an embodiment of the disclosed communication methodology at the network application layer of the server IHS.

The flowchart of FIG. 6 shows how server network application 280" in the operating system 281' of the server IHS 200 may connect to client user application 382 in client IHS 300 using multiple network protocols. The flowchart of FIG. 6 shows an embodiment in which the server network application 280 binds a single TCP/IP socket 291 to multiple addresses. Operating system 281' may include a socket library 286 for storing IP addresses. Process flow commences with start block 610. The server network application 280" creates an entry for TCP/IP socket 291 in TCP/IP stack 284, as per block 615. The server network application 280" binds a single listening TCP/IP socket 291 at the TCP/IP stack 284 in the server IHS 200 to multiple IP address/port tuples to form a specific IP address/port pair by the TCP/IP stack prior to completing the accept( ) call, as per block 620. The multiple IP address/port tuples may include IP addresses exhibiting different network protocols. The TCP/IP stack 284 adds the IP addresses to socket mappings into the hash table 292 of socket library 286, as per block 625. The server network application 280' adds additional IP address bindings to the single socket, as per block 630. Server network application 280" listens for incoming connections on the newly created TCP/IP socket 291, as per block 635. Client user application 382 of client IHS 300 sends a connection request to server IHS 200 using a destination IP address for which server network application 280" monitors or listens (one of the addresses added to the hash table 292), as per block 640. Server network application 280" accepts a new connection over that TCP/IP socket 291, as per block 645. The TCP/IP stack 284 takes that entry in the hash table 292 and creates the TCP/IP socket 291, as per block 650. The TCP/IP stack 284 posts back to the outstanding accept call from the server network application 280" with a new accepted connection for that particular client user application 382, as per block 655. Operation ends with end block 665. The server network application 280" now has a connection to the client user application 382.

The disclosed methodology enables a single socket to listen on multiple IP addresses. In one embodiment, these IP addresses may be IPv4, IPv6, or a combination of IPv4 and IPv6 addresses. For applications that support a single socket, this methodology enables configuration of such applications as a bind-specific server that accepts connection requests over both the IPv4 and IPv6 network protocol transports. Users who employ configuration options outside of applications may change a generic server into a bind-specific server that is capable of accepting connections over both network protocol transports. The disclosed methodology may avoid potentially costly changes to customer applications.

As will be appreciated by one skilled in the art, aspects of the disclosed methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 4, 5 and 6 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 4, 5 and 6 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIG. 3 described above.

The flowcharts of FIGS. 4, 5 and 6 illustrate the architecture, functionality, and operation of possible implementations of systems, methods and computer program products that perform network analysis in accordance with various embodiments of the present invention. In this regard, each block in the flowcharts of FIGS. 4, 5 and 6 may represent a module, segment, or portion of code, which comprises one or more executable instructions for implementing the specified logical function(s). It should also be noted that, in some alternative implementations, the functions noted in the block may occur out of the order noted in FIGS. 4, 5 and 6. For example, two blocks shown in succession may, in fact, be executed substantially concurrently, or the blocks may sometimes be executed in the reverse order, depending upon the functionality involved. It will also be noted that each block of FIGS. 4, 5 and 6 and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. An information handling system (IHS), comprising:
   a processor;
   a memory, coupled to the processor,
      the memory being configured to create a socket in the IHS and map multiple IP addresses to the socket;
      the memory being further configured such that the socket listens for connection requests on the multiple IP addresses and receives connection requests for the multiple addresses via a multiple protocol network;
      the memory being further configured with a TCP/IP stack that retrieves a list of IP addresses from a network application in the IHS; and
      the memory being further configured to map the IP addresses in the list of IP addresses to the socket, wherein the TCP/IP stack adds the IP addresses of the list of IP addresses to a hash table in the IHS such that the hash table provides IP address to socket mappings.

2. The IHS of claim 1, wherein the multiple IP addresses include IP addresses exhibiting different network protocols.

3. The IHS of claim 1, wherein the memory is further configured with a network application that binds the socket at a TCP/IP layer of the IHS to multiple IP address/port tuples to form a connection with another application over the multiple protocol network.

4. An information handling system (IHS), comprising:
   a processor;
   a memory, coupled to the processor,
      the memory being configured to create a plurality of sockets in the IHS and to map a respective IP address to each of the sockets of the plurality of sockets;
      the memory being further configured to bind each socket of the plurality of sockets to more than one IP address; and
      the memory being further configured such that each of the sockets listens for connection requests on the more than one IP address and each of the sockets receives connection requests for each of the sockets with more than one IP address via a multiple protocol network.

5. The IHS of claim 4, wherein the memory is further configured to create the plurality of sockets in a socket library of the IHS.

6. The IHS of claim 5, wherein the memory is further configured such that the socket library accepts a connection request over an available socket in the socket library.

7. The IHS of claim 4, wherein the memory is further configured to create the plurality of sockets in a server network application of the IHS.

8. The IHS of claim 7, wherein the memory is further configured such that the server network application accepts a connection request over an available socket in the server network application.

9. A server network application computer program product, comprising:
   a computer readable storage medium for use in an information handling system (IHS):
   first instructions that create a socket in the IHS;
   second instructions that map multiple IP addresses to the socket;
   third instructions that configure the socket to listen for connection requests on the multiple IP addresses; and
   fourth instructions that receive connection requests for the multiple addresses via a multiple protocol network;
   fifth instructions that configure a TCP/IP stack in the IHS to retrieve a list of IP addresses from a network application in the IHS;
   wherein the second instructions that map the multiple IP addresses to the socket include instructions that map the IP addresses in the list of IP addresses to the socket; and
   sixth instructions that configure the TCP/IP stack to add the IP addresses of the list of IP addresses to a hash table in the IHS such that the hash table provides IP address to socket mappings;
   wherein the first, second, third, fourth, fifth and sixth instructions are stored on the computer readable storage medium.

10. The server network application computer program product of claim 9, wherein the multiple IP addresses include IP addresses exhibiting different network protocols.

11. The server network application computer program product of claim 9, further comprising:
    seventh instructions that configure the server network application to bind the socket at a TCP/IP layer of the IHS to multiple IP address/port tuples to form a connection with another application over the multiple protocol network.

* * * * *